(12) United States Patent
Thorburn et al.

(10) Patent No.: US 6,898,428 B2
(45) Date of Patent: May 24, 2005

(54) SATELLITE COMMUNICATION SYSTEM WITH GATEWAY SWITCH NETWORKS

(75) Inventors: Michael Thorburn, Glendale, CA (US); Craig Ziegler, Sunnyvale, CA (US); Stephen C. Holme, San Ramon, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 446 days.

(21) Appl. No.: 09/871,075

(22) Filed: May 31, 2001

(65) Prior Publication Data

US 2002/0183057 A1 Dec. 5, 2002

(51) Int. Cl.[7] .............................................. H04Q 7/20
(52) U.S. Cl. ....................... 455/427; 455/428; 455/430; 455/12.1; 455/422.1; 455/562.1; 370/401; 370/353; 370/336; 370/335; 370/325; 370/316
(58) Field of Search ................................ 370/441, 335, 370/336, 353, 316, 325, 535, 401; 455/427, 428, 430, 12.1, 422.1, 562

(56) References Cited

U.S. PATENT DOCUMENTS 6,317,420 B1 * 11/2001 Schiff ........................ 370/325

2001/0021195 A1 * 9/2001 Miller et al. ................ 370/441
2002/0128045 A1 * 9/2002 Chang et al. ............... 455/562

* cited by examiner

Primary Examiner—Marsha D. Banks-Harold
Assistant Examiner—Randy Peaches
(74) Attorney, Agent, or Firm—Karambelas & Associates

(57) ABSTRACT

A communication system having gateway filter and switching networks in forward and return channels of a frequency reuse communication satellite. The system couples subscriber terminals to the Internet or other terrestrial network by way of one or more gateways. The system cross-straps gateway-to-user beam connectivity provided by the commmunication satellite to allow full coverage of all user beams with a subset of the gateways having reduced frequency reuse. An exemplary system comprises a communication satellite having a return channel and a forward channel. One or more gateways are coupled to the Internet or other terrestrial network and communicate with subscriber terminals by way of the return and forward channels provided by the satellite. The return and forward channels each comprise a filter and switching network that selectively couple signals between the one or more gateways and the subscriber terminals. The filter and switching networks selectively couples signals between selected gateways and selected subscriber terminals using predetermined beams.

8 Claims, 9 Drawing Sheets

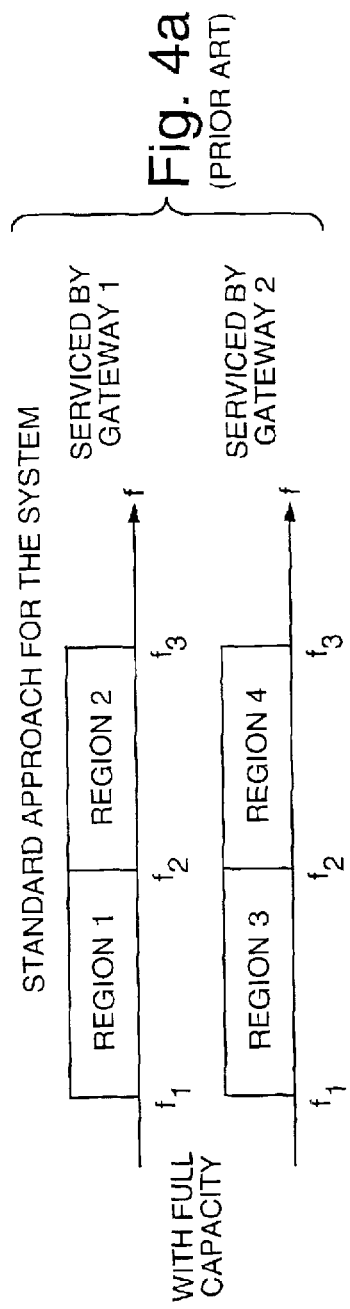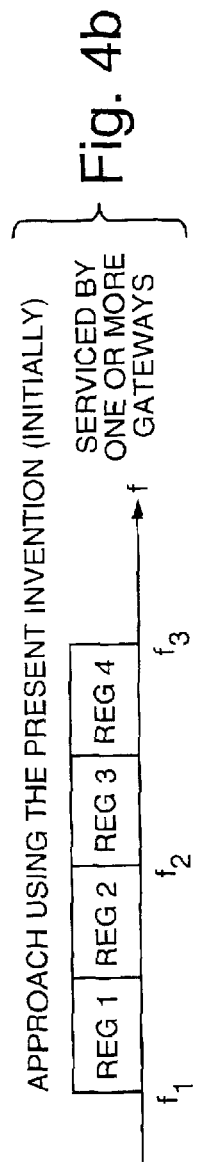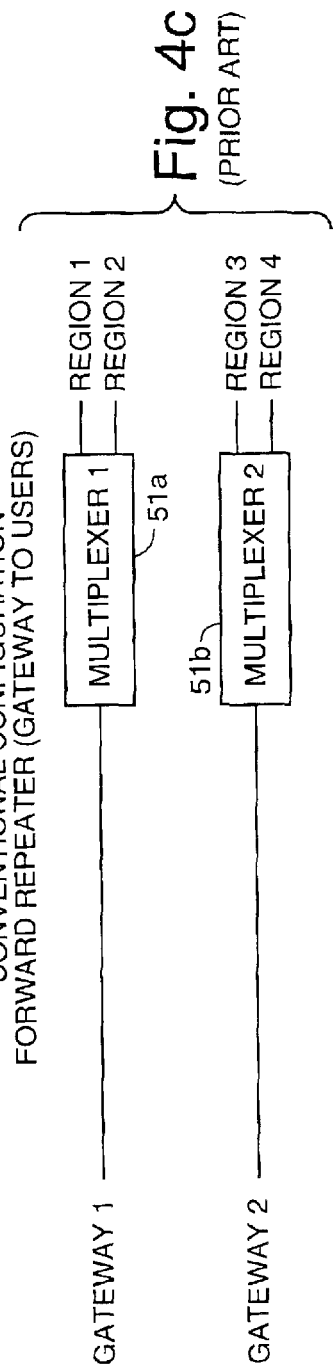

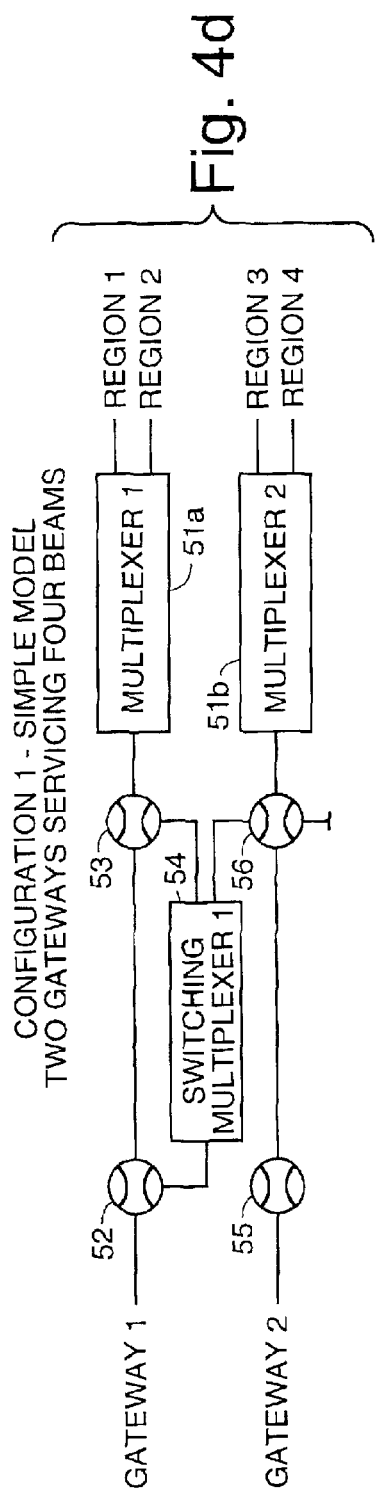
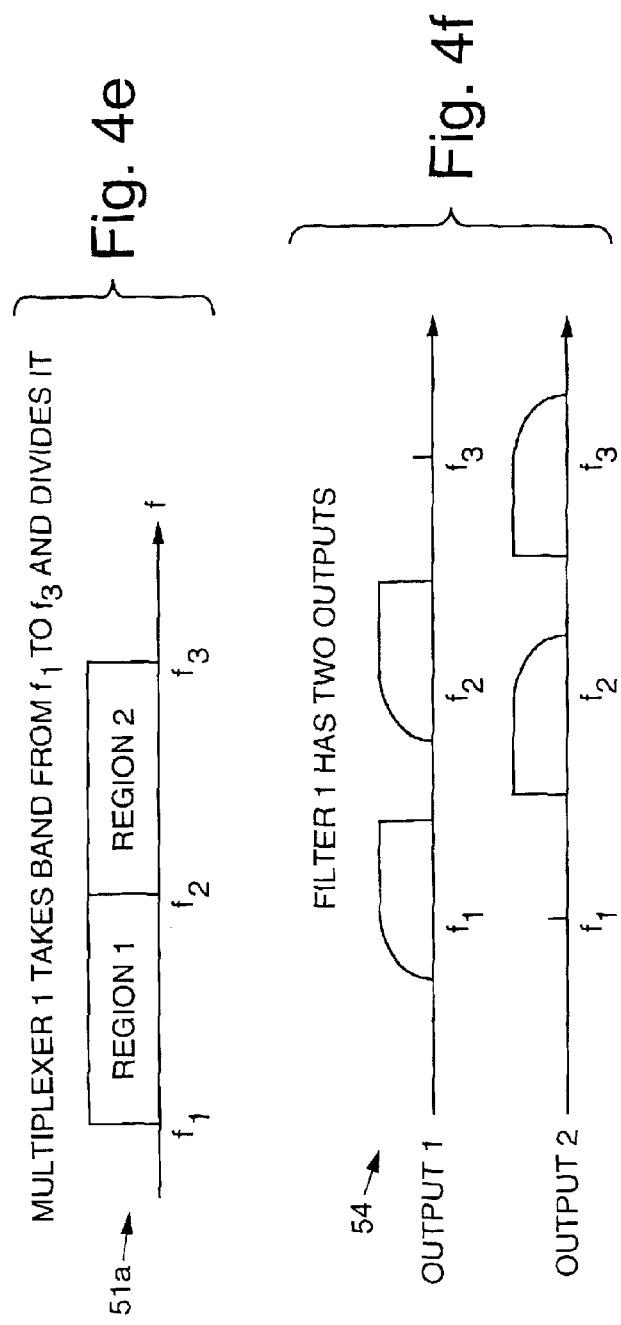

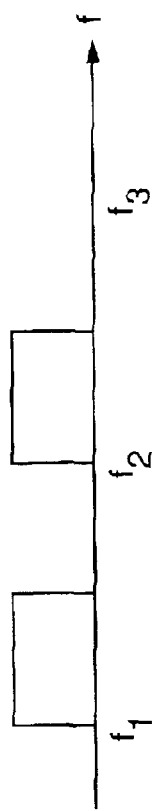
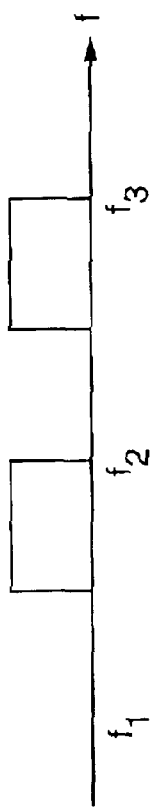
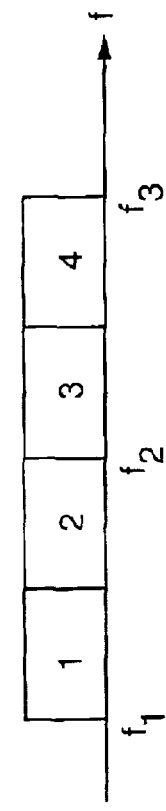

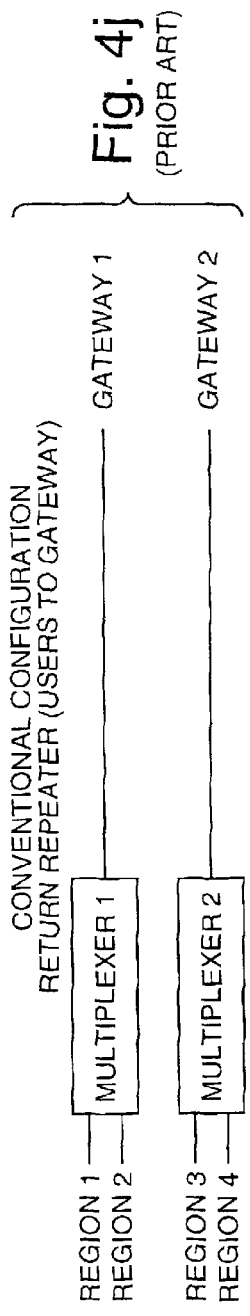
Fig. 4j (PRIOR ART)
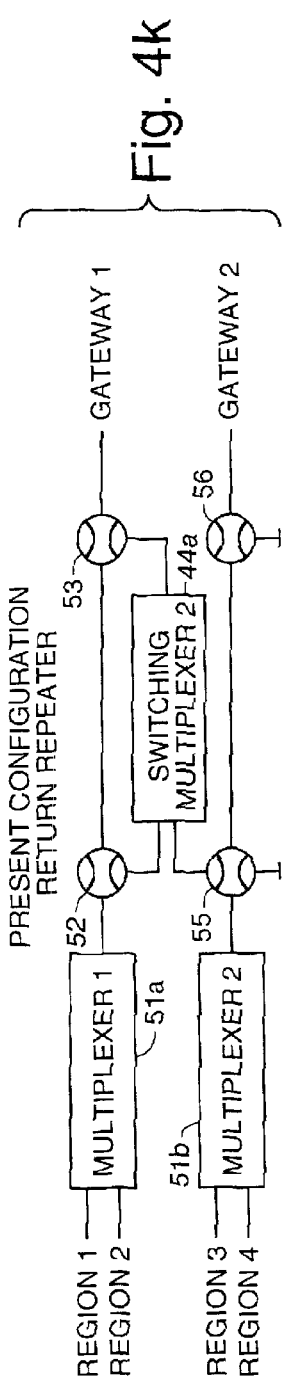
Fig. 4k
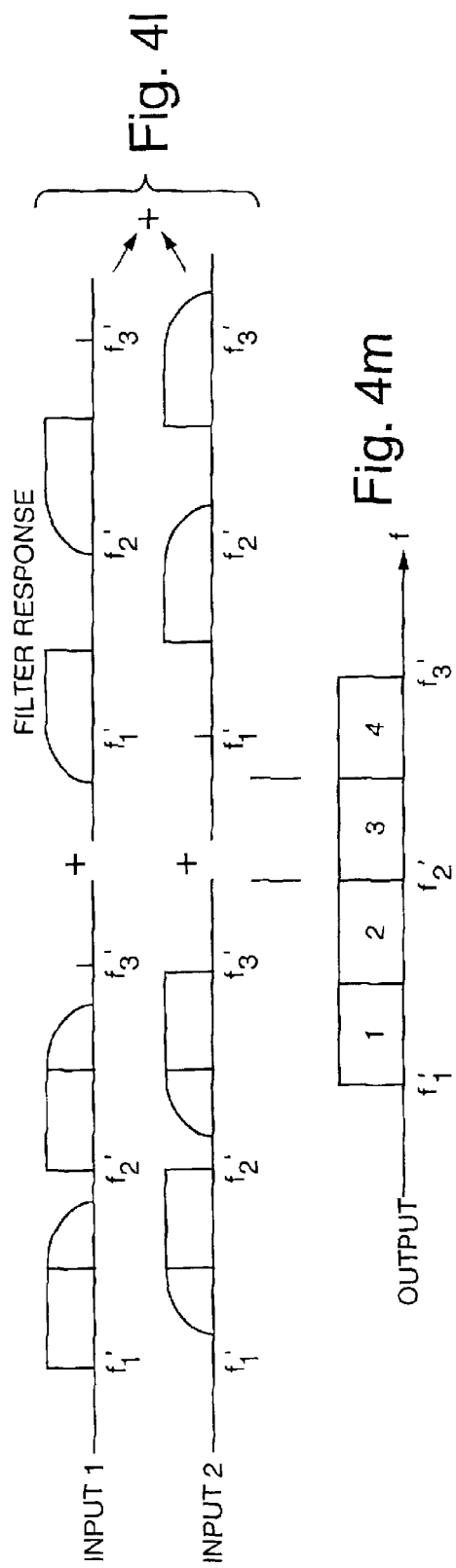
Fig. 4l
Fig. 4m

SATELLITE COMMUNICATION SYSTEM WITH GATEWAY SWITCH NETWORKS

BACKGROUND

The present invention relates generally to satellite communication systems, and more particularly, to a satellite communication system employing gateway switch networks that permit full coverage of all user beams with a subset of the gateways having reduced frequency reuse.

Typical frequency reuse satellite communication systems support one or several gateways and provide a connection between each gateway and the multiple beams it supports. The frequency reuse of the communication system is achieved because the satellite supports a number of gateways and beams in parallel.

It would be desirable to have a communication system that permits a gradual increase in communication bandwidth commensurate with an increase in usage. It would be desirable to have a communications system employing a frequency reuse satellite that may be deployed to serve the full coverage area at reduced bandwidth with a subset of the full complement of gateways for which the satellite system was designed. It would be desirable to have a communications system employing satellites to back up one gateway using another (backup) gateway by partitioning and sharing the backup gateway's reused bandwidth.

It is therefore an objective of the present invention to provide for an improved communication system employing gateway switch networks that permit full coverage of all user beams with a subset of the gateways having reduced frequency reuse.

SUMMARY OF THE INVENTION

The present invention provides for a communication system that comprises gateway switching networks in forward and return channels of a frequency reuse communication satellite that are used to couple subscriber terminals to the Internet or other terrestrial network by way of one or more gateways. The present invention cross-straps gateway-to-user beam connectivity provided by the communication satellite to allow full coverage of all user beams with a subset of the gateways having reduced frequency reuse.

An exemplary communication system comprises a communication satellite having a return channel and a forward channel. One or more gateways are coupled to the Internet or other terrestrial network and communicate with subscriber terminals by way of the return and forward channels provided by the satellite. The return and forward channels each comprise a switching network that selectively couple signals between the one or more gateways and the subscriber terminals. The switching networks selectively couples signals between selected gateways and selected subscriber terminals using predetermined beams.

The advantages of the present invention over a conventional communication system that does not employ gateway switch networks are that the infrastructure, including the gateways and backbone fiber optic network for the communication system can be deployed as the customer base increases. In addition, a temporary loss of a gateway and the resulting loss of coverage can be overcome by switching to a reduced frequency reuse mode wherein a backup gateway is used to provide connectivity to the satellite in place of the inoperative gateway.

The present invention allows a communications system employing a frequency reuse satellite that is deployed to serve a full coverage area to operate at a reduced bandwidth using a subset of the full complement of gateways for which the satellite was designed. The present invention also allows a communications system employing a satellite to back up one gateway using another (backup) gateway by partitioning and sharing the backup gateway's reused bandwidth.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 4a–m illustrate details of an exemplary switch network employed in the satellite communication system.

DETAILED DESCRIPTION

Figure 1:
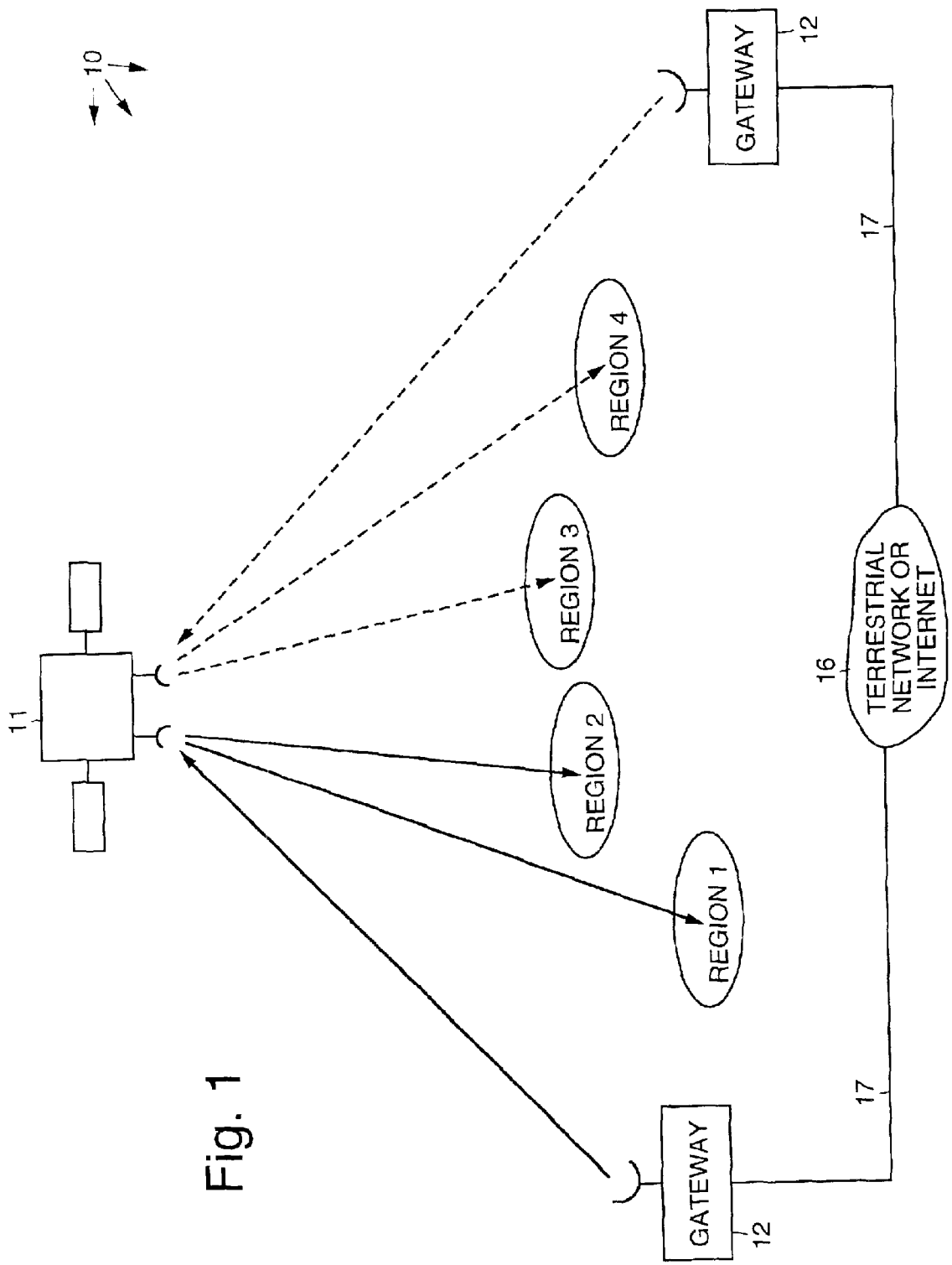
FIG. 1 illustrates an exemplary satellite communication system in accordance with the principles of the present invention.

Referring to the drawing figures, FIG. 1 illustrates an operating environment of an exemplary communication system 10 in accordance with the principles of the present invention. The exemplary communication system 10 is used to interconnect a plurality of subscriber terminals 13 to the Internet 16 or other terrestrial network 16.

The exemplary communication system 10 comprises one or more gateways 12 that are coupled to the Internet 16 or other terrestrial network 16 by way of a fiber optic network 17, for example. A frequency reuse communication satellite 11 communicates with the one or more gateways 12 and generates a plurality of beams that transmit signals to and receive signals from a plurality of regions. Reuse of the frequency bandwidth of the communication satellite 11 is achieved when multiple gateways 12 are employed.

In the exemplary system 10 shown in FIG. 1, a first gateway 12 communicates with region 1 and region 2, while a second gateway 12 communicates with region 3 and region 4. Further implementation details of the system 10 are discussed below.

Figure 1A:
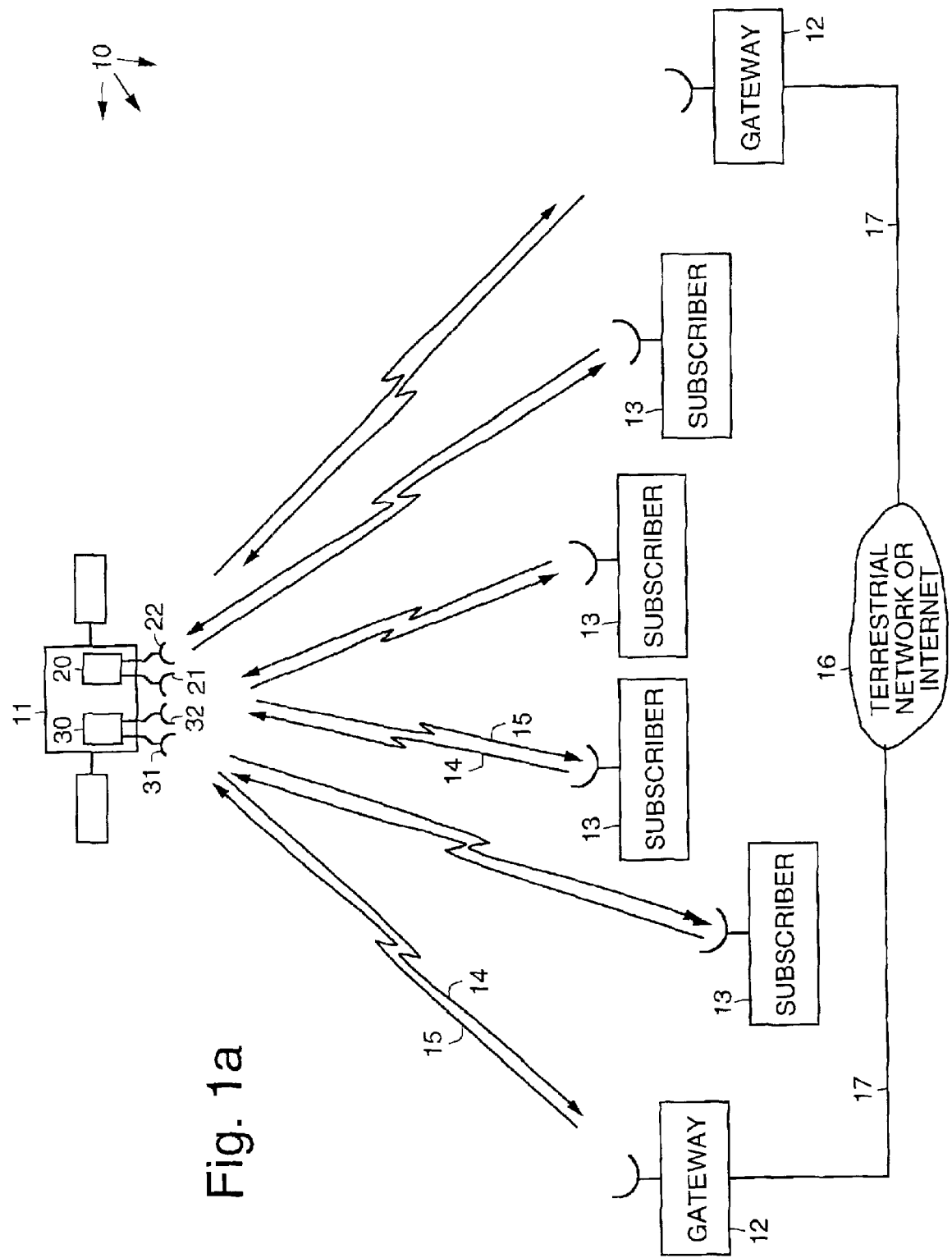
FIG. 1a illustrates details of the exemplary satellite communication system shown in FIG. 1.

FIG. 1a illustrates details of the exemplary satellite communication system 10. The communication satellite 11 comprises a return channel 20 and a forward channel 30. The return channel 20 comprises receive and transmit antennas 21, 22, and the forward channel 30 also comprises receive and transmit antennas 21, 22. The improvements provided by the present invention are implemented in the return and forward channels 20, 30.

Each of the gateways 12 are coupled to the Internet or other terrestrial network 16 by way of the network 17. The plurality of subscriber terminals 13 are coupled to the Internet or other terrestrial network 16 by way of the satellite 11, the one or more gateways 12 and the fiber optic network 17. The subscriber terminals 13 communicate with the Internet or other terrestrial network 16 by way of the satellite 11 to make requests for data using a return path 14 comprising the return channel 20 of the satellite 11. Data derived from the Internet 16 or other terrestrial network 16 is forwarded to the subscriber terminals 13 by way of the fiber optic network 17, a selected gateway 12, and a forward path 15 through the forward channel 30 of the satellite 11.

Thus, the satellite 11 provides for bi-directional communication between the subscriber terminals 13 and the gateways 12. The satellite 11 provides a "last mile" connection from the Internet 16 or other terrestrial network 16 to the subscriber terminals 13.

In a normal operational scenario, the communication system 10 is designed to operate using its full bandwidth, which supports multiple gateways 12. However, early on in the lifetime of the system 10, the number of subscriber terminals 13 is far less than the number that may be supported by the system 10.

Heretofore, in order to properly operate the system 10, all required gateways 12 would need to be operational at commencement of system operation. For example, a system 10 implementing six-time frequency reuse, requires six gateways 12 for full-up operation. This is expensive due to the cost of the gateways 12, and in light of the fact that typically few subscriber terminals use the system 10. The full system bandwidth capacity is typically not required when the system 10 is initially made operational. However, in accordance with the principles of the present invention, the system 10 may be made operational without using all required gateways 12, and may be implemented using from one to all of the gateways 12 supported by the satellite 11.

This is accomplished using switch networks 25, 37 in accordance with the present invention in the return and forward channels 20, 30. The switch networks 25, 37 are described with reference to FIGS. 2–5. Use of the switch networks 25, 37 allows use of a limited number of gateways 12 using less than full-system bandwidth.

The switch networks 25, 37 allow complete beam coverage from the satellite 11 using a minimal subset of gateways 12. As capacity requirements of the system 10 increase, additional gateways 12 are provided, switches and/or filters and/or switching multiplexers of the switch networks 25, 37 are reconfigured, and the capacity of the system 10 is increased to support more gateways 12 and subscriber terminals 13. The total bandwidth of the system 10 is used initially, and frequencies are reused with added gateways 12.

Figure 2:
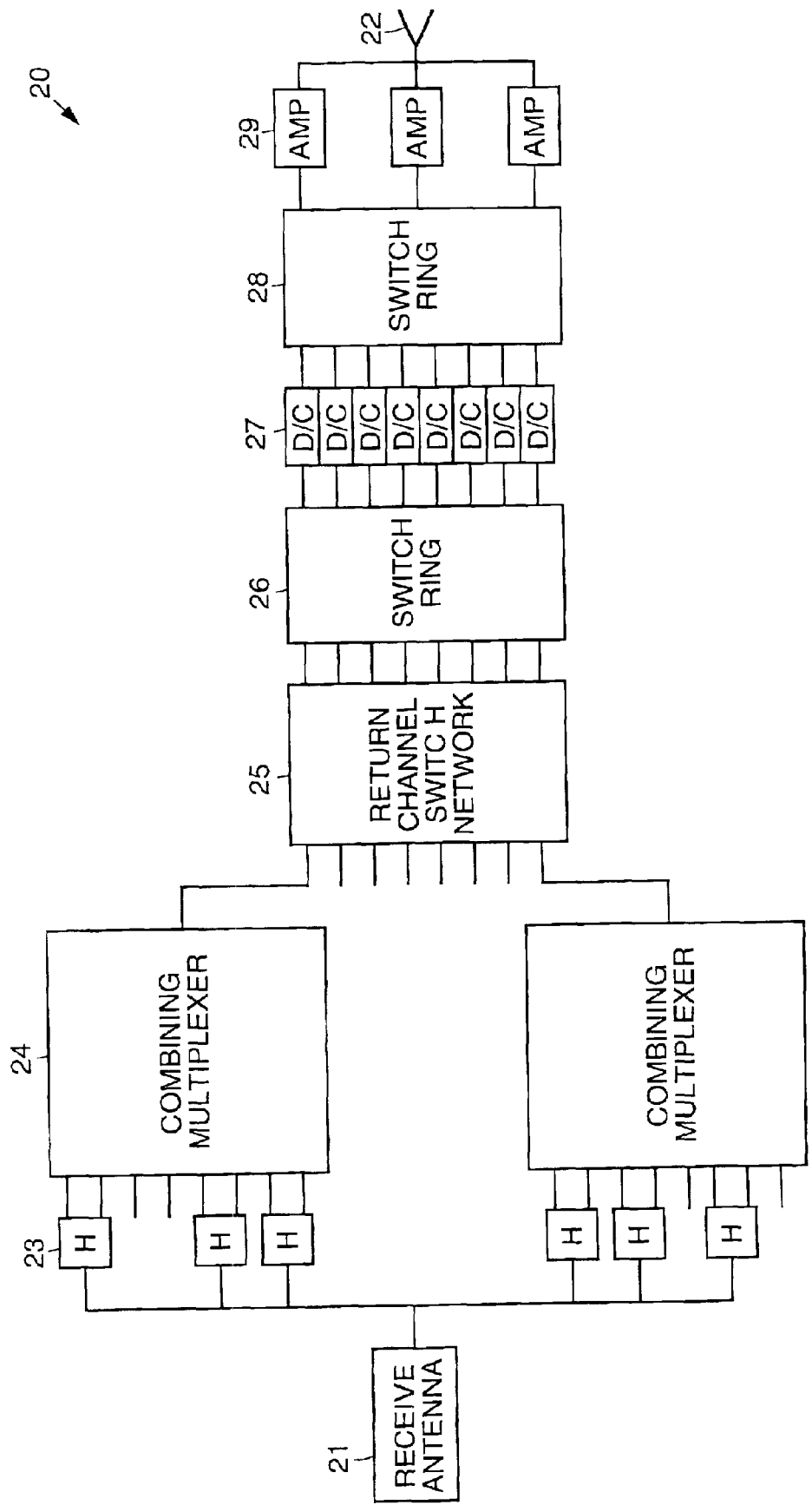
FIG. 2 illustrates a return channel of the satellite communication system.

Referring now to FIG. 2, it illustrates details of the return channel 20 of the satellite 11 used in the exemplary satellite communication system 10. The return channel 20 comprises the receive antenna 21 which is coupled by way of a plurality of hybrid couplers (H) 23 to one or more combining multiplexers 24. The outputs of the one or more combining multiplexers 24 are coupled to a return channel switch network 25 which receives inputs from each of the combining multiplexers 24.

The return channel switch network 25 has a plurality of outputs that are coupled to a first switch ring 26. Respective outputs of the first switch ring 26 are individually coupled by way of a plurality of downconverters (D/C) 27 to a second switch ring 28. The output of the second switch ring 28 is coupled by way of a high power amplifier 29 to the transmit antenna 22.

Figure 3:
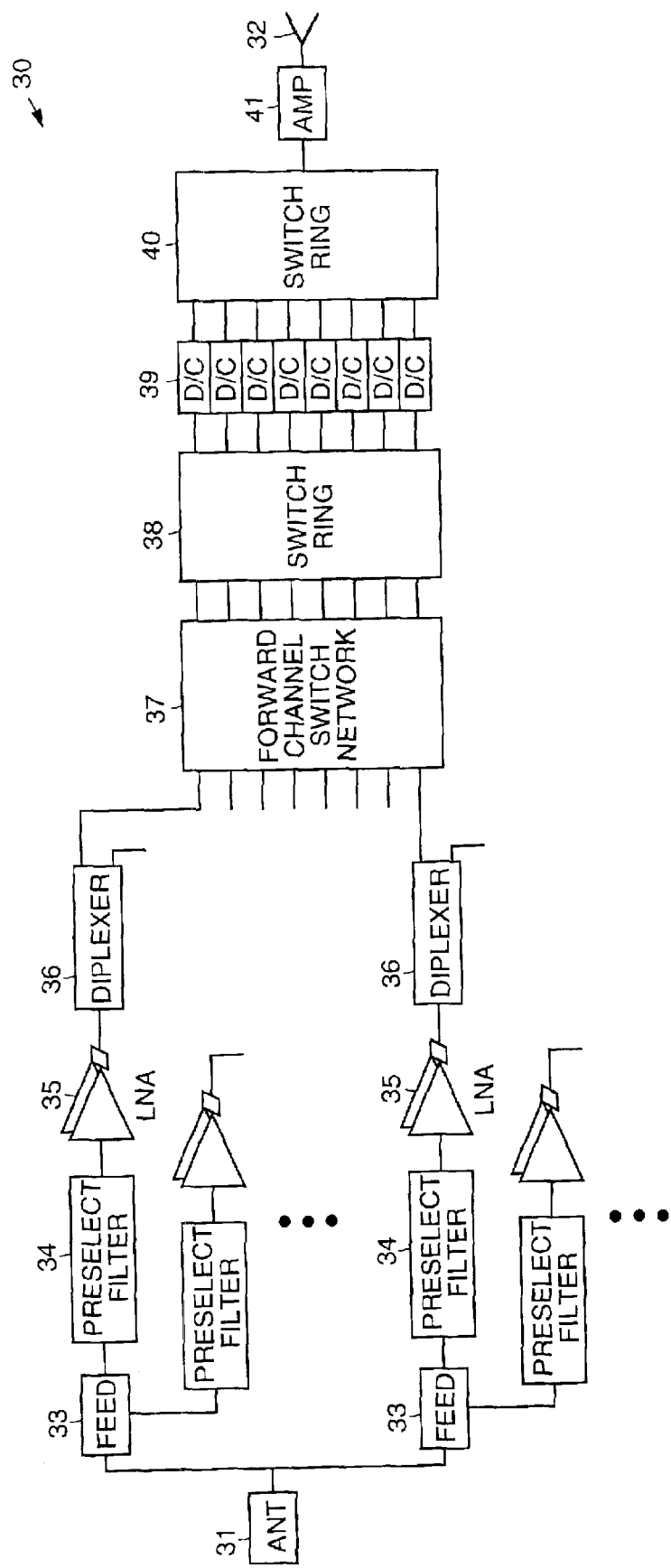
FIG. 3 illustrates an exemplary forward channel of the satellite communication system.

FIG. 3 illustrates details of the forward channel 30 of the satellite 11 used in the exemplary satellite communication system 10. The forward channel 30 comprises the receive antenna 31 which is coupled by way of a plurality of feeds 33 to a plurality of preselect filters 34. Outputs of the preselect filters 34 are coupled to low noise amplifiers 35. Outputs of selected low noise amplifiers 35 are coupled to a corresponding diplexer 36, while others of the low noise amplifiers 35 are coupled to a forward channel switch network 37 or a diplexer 36.

Outputs of each of the low noise amplifiers 35 or diplexers 36 are coupled to the forward channel switch network 37. The forward channel switch network 37 has a plurality of outputs that are coupled to a first switch ring 38. Respective outputs of the first switch ring 38 are individually coupled by way of a plurality of downconverters (D/C) 39 to a second switch ring 40. The output of the second switch ring 40 is coupled by way of a high power amplifier 41 to the transmit antenna 32.

Details of the design and operation of exemplary return and forward channel switch networks 25, 37 will now be discussed. FIGS. 4a–m illustrate details of an exemplary simple switch network 25, 37 that may be employed in the return and forward channels 20, 30.

Referring to FIG. 4a, it shows a standard approach used in the system 10, which is the scenario shown in FIG. 1. With full capacity, the first gateway 12 services regions 1 and 2, while the second gateway 12 services regions 3 and 4. Region 1 serviced by the first gateway 12 is covered between frequencies f1 and f2. Region 2 serviced by the first gateway 12 is covered between frequencies f2 and f3. Region 3 serviced by the second gateway 12 is covered between frequencies f1 and f2. Region 4 serviced by the second gateway 12 is covered between frequencies f2 and f3.

In contrast to this technique, using the present invention, initially regions 1–4 are serviced by all gateways 12. All gateways 12 service regions 1 and 2 using frequencies between frequencies f1 and f2, and service regions 3 and 4 using frequencies between frequencies f2 and f3.

FIG. 4c shows the conventional forward link repeater (implemented by the satellite 11) that transmits data from the gateways 12 to users (subscriber terminals 13). The first gateway 12 (gateway 1) transmits data by way of a first multiplexer 51a to regions 1 and 2. The second gateway 12 (gateway 2) transmits data by way of a second multiplexer 51b to regions 3 and 4.

FIG. 4d shows a simple configuration of a system 10 in accordance with the present invention using two gateways 12 servicing four beams. FIG. 4d shows a forward repeater in accordance with the present invention (implemented by the satellite 11) that transmits data from the gateways 12 to users (subscriber terminals 13) in various regions (regions 1–4).

Data transmitted from a first gateway 12 (gateway 1) is coupled to a first switch 52. A first output of the first switch 52 is coupled to a switching (gateway) multiplexer 54. A first output of the switching (gateway) multiplexer 54 and a second output of the first switch 52 are coupled to a second switch 53. An output of the second switch 53 is coupled to a first regional multiplexer 51a. Outputs of the first regional multiplexer 51a service regions 1 and 2.

Data transmitted from a second gateway 12 (gateway 2) is coupled to a third switch 55. An output of the third switch 55 is coupled to a first input of a fourth switch 56. A second output of the switching (gateway) multiplexer 54 is coupled to a second input of the fourth switch 56. An output of the fourth switch 56 is coupled to a second regional multiplexer 51b. Outputs of the second regional multiplexer 51b service regions 3 and 4.

With reference to FIG. 4e, the first regional multiplexer 51a takes the frequency band between frequency f1 and frequency f3 and divides it into two regions. As is shown in FIG. 4f, the switching (gateway) multiplexer 54 has two outputs. The first output (output 1) is the upper trace of FIG. 4f, while the second output (output 2) is the lower trace of FIG. 4f.

As is shown in FIG. 4g, the first output (output 1 shown in FIG. 4f) is combined in the first regional multiplexer 51a to produce regions 1 and 3. As is shown in FIG. 4h, the second output (output 2 shown in FIG. 4f) is combined in the first regional multiplexer 51a to produce regions 2 and 4.

As is shown in FIG. 4i, the output of the switching (gateway) multiplexer 54 combined with the output of the regional multiplexers 51a, 51b produces the desired regional coverage which meets channelization requirements of the system 10. The switches 52, 53, and 56 also route the bandwidth appropriately.

FIG. 4j shows a conventional return link repeater (implemented on the satellite 11, which transmits data from the users (subscriber terminals 13) and the gateways 12. This configuration is the complement of the configuration shown in FIG. 4c. Data from regions 1 and 2 are multiplexed in a first multiplexer 51a and transmitted to the first gateway 12 (gateway 1). Similarly, data from regions 3 and 4 are multiplexed in a second multiplexer 51b and transmitted to the second gateway 12 (gateway 2).

FIG. 4k shows a configuration in accordance with the present invention illustrating a return link repeater that uses two gateways 12 servicing four beams. The return link repeater transmits data from the users (subscriber terminals 13) to the gateways 12.

Data transmitted from regions 1 and 2 are input to a first regional multiplexer 51a. The output of the first regional multiplexer 51a is coupled to a first switch 52. A first output of the first switch 52 is coupled to a first input of a second switch 53. A second output of the first switch 52 is coupled to a second switching (gateway) multiplexer 54a.

Data transmitted from regions 3 and 4 are input to a second regional multiplexer 51b. The output of the second regional multiplexer 51b is coupled to a third switch 55. A first output of the third switch 55 is coupled to a first input of a fourth switch 56. Second inputs of the third and fourth switches 55, 56 are each coupled to a load. A second output of the third switch 55 is coupled to the second switching (gateway) multiplexer 54a. The output of the second switching (gateway) multiplexer 54a is coupled to a second input of the second switch 53. The output of the second switch 53 is coupled to a first gateway 12 (gateway 1). The output of the fourth switch 56 is coupled to a second gateway 12 (gateway 2).

As is shown in FIG. 4l, the second switching (gateway) multiplexer 54a (switching multiplexer 2) has two inputs, shown as the upper and lower traces at the left side of FIG. 4l. The filter response of the second switching (gateway) multiplexer 54a is shown as the upper and lower traces at the right side of FIG. 4l. The outputs of the second switching (gateway) multiplexer 54a are combined to produce the output which is shown in FIG. 4m.

Thus, in the present invention, a switch network 25, 37 is installed in both the forward and return channels 30, 20, or links 30, 20, of the frequency-reuse satellite 11. The switch network 25, 37 is designed so that initially, the available bandwidth comes from a subset of the full complement of gateways 12. For example, a system 10 having a satellite 11 that provides six-times frequency reuse may require six gateways 12 to service North America. The present invention permits total coverage of North America by a single gateway 12 without frequency reuse, or by two gateways 12 providing two-times frequency reuse, by three gateways 12 providing three-times frequency reuse, and so forth.

The reconfiguration of the switch network 25, 37 with frequency reassignment can be implemented switching that interconnects available filters or switching multiplexers. The reconfiguration of the switch network 25, 37 may be set using ground commands uplinked to the satellite 11.

The switch network 25, 37 is preferably installed in low-power sections of both the forward and return links 30, 20, thus limiting impact to a gain/noise temperature (G/T) figure of merit and Equivalent Isotropic Radiated Power (EIRP) budgets.

In practice, the communication system provider may roll out the system 10 with a minimal set of gateways 12 and the communication satellite 11. As subscriber terminals 13 increase, more gateways 12 may be added to provide additional bandwidth to each region in the coverage area. Eventually, the full complement of gateways 12 for which the satellite 11 was designed can be operational to provide maximum bandwidth through frequency reuse. This reduces the initial cost of establishing the gateway infrastructure prior to establishing the customer base and revenue stream.

Figure 5:
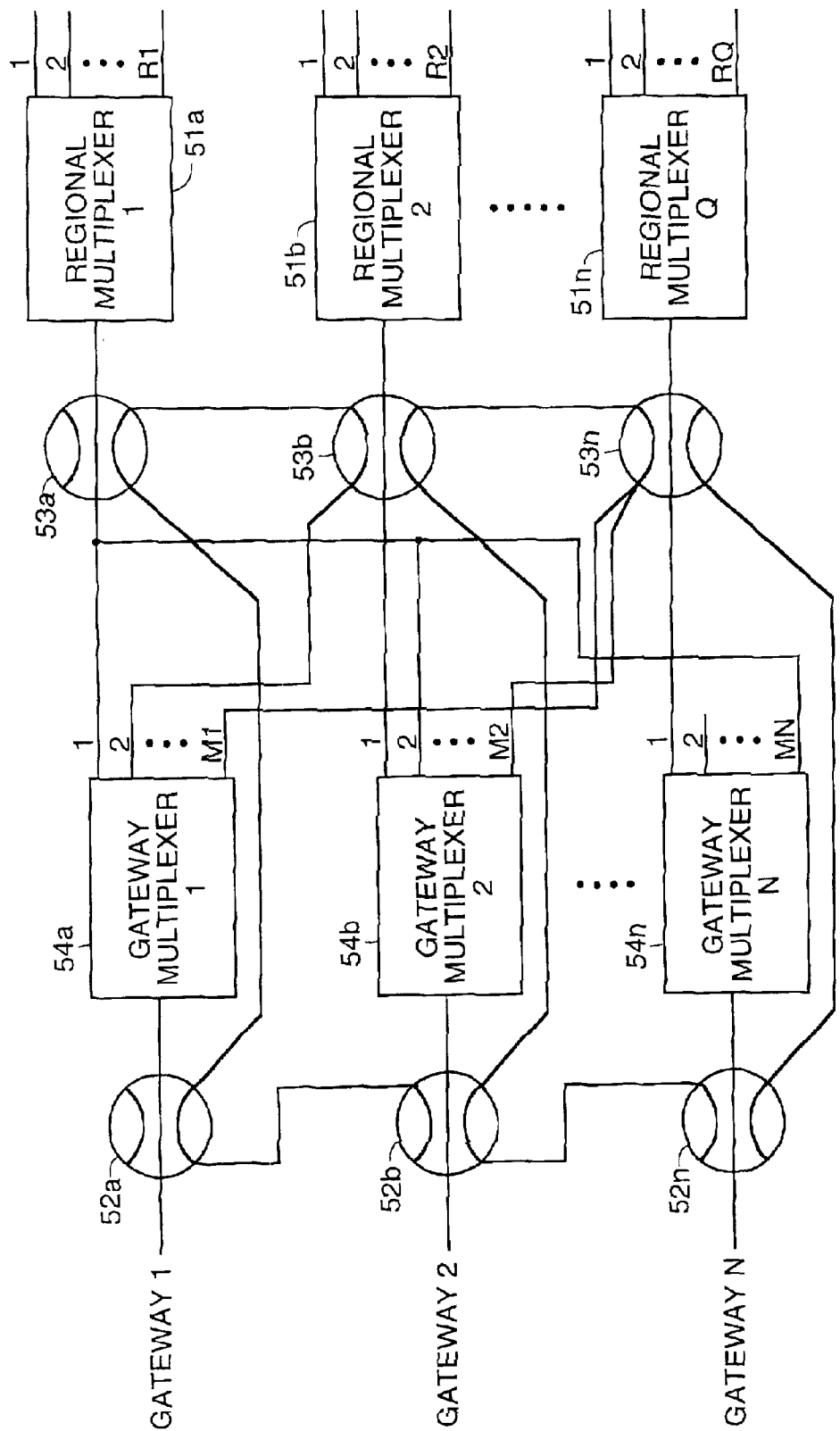
FIG. 5 illustrates a generic switch network in accordance with the principles of the present invention.

FIG. 5 illustrates a generic and more complex switch network 25, 37 in accordance with the principles of the present invention. FIG. 5 illustrates the flexibility and expandability of the present invention. FIG. 5 shows a complex configuration of a system 10 using multiple (N) gateways 12 servicing multiple beams.

Data transmitted from a plurality of gateways 12 (gateways 1-N) are coupled to a plurality of first switches 52a–52n. The plurality of first switches 52a–52n are selectively coupled to a plurality of gateway (switching) multiplexers 54a–54n, are selectively coupled to each other, and are selectively coupled to a plurality of second switches 43a–43n. The plurality of second switches 43a–43n are respectively coupled to a plurality of regional multiplexers 51a–51q. The plurality of regional multiplexers 51a–51q respectively service regions 1-R1, 1-R2 and 1-RQ.

As should be evident from looking at FIG. 5, signals transmitted from the respective gateways 12 may be selectively routed via the plurality of first switches 52a–52n through one or more of the gateway multiplexers 54a–54n and plurality of second switches 43a–43n to one or more of the plurality of regional multiplexers 51a–51q. The signals transmitted from one, two, or all of the gateways 12 may be appropriately routed to one, two, or all of the regional multiplexers 51a–51q. Each of the regional multiplexers 51a–51q services regions supported by the system 10 and allows one, two, or all of the gateways 12 to be operational and fully support the system 10.

Thus, it should be clear that the system 10 may be made operational without using all gateways 12, and may be implemented using from one to all of the gateways 12 supported by the satellite 11. The system 10 incorporating the present switch networks 25, 37 cross-straps gateway-to-user beam connectivity provided by the communication satellite to allow full coverage of all user beams with a subset of the gateways 12 with reduced frequency reuse.

Thus, an improved communication system employing satellite-based gateway switch networks has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A communication system comprising:

one or more gateways coupled to a terrestrial network;

one or more subscriber terminals that are to be coupled to the terrestrial network;

a communication satellite providing forward and return communication links between the one or more gateways and the one or more subscriber terminals that each comprise a switching network that selectively couples signals between selected gateways and selected subscriber terminals using predetermined beams wherein the forward communication link implemented in the communication satellite comprises: a plurality of first switches that receives data transmitted from a respective plurality of gateways; one or more forward channel gateway multiplexers selectively coupled to one of the plurality of first switches; a plurality of second switches selectively coupled to outputs of the plurality of first switches and selectively coupled to outputs of the one or more forward channel gateway multiplexers; and one or more regional multiplexers selectively coupled to the plurality of second switches that output data to a plurality of regions servicing the one or more subscriber terminals.

2. The communication system as recited in claim 1 wherein selected ones of the pluralities of first and second switches comprise power dividing hybrids.

3. The communication system as recited in claim 1 wherein the forward communication link implemented in the communication satellite comprises:

a first switch for receiving data transmitted from a first gateway;

a third switch for receiving data transmitted from a second gateway;

a forward channel gateway multiplexer coupled to the first switch;

a second switch coupled to the first switch and to a first output of the forward channel gateway multiplexer;

a fourth switch coupled to the third switch and to a second output of the forward channel gateway multiplexer;

a first multiplexer coupled to the second switch that outputs data to a first plurality of regions; and a second multiplexer coupled to the fourth switch that outputs data to a second plurality of regions.

4. The communication system recited in claim 1 wherein the return communication link implemented in the communication satellite comprises:

one or more regional multiplexers that receive data transmitted from subscriber terminals located in a plurality of regions;

a plurality of third switches respectively coupled to the one or more regional multiplexers;

one or more return channel gateway multiplexers selectively coupled to the plurality of third switches; and a plurality of fourth switches selectively coupled to the one or more return channel gateway multiplexers and plurality of third switches that output data to the one or more gateways.

5. The communication system as defined in claim 4 wherein one of the pluralities of third and fourth switches comprises power dividing hybrids.

6. The communication system as defined in claim 1 wherein the return communication link implemented in the communication satellite comprises:

a first multiplexer for receiving data transmitted from a first plurality of regions;

a second multiplexer for receiving data transmitted from a second plurality of regions;

a first switch coupled to the first multiplexer;

a second switch coupled to the second multiplexer;

a return channel gateway multiplexer selectively coupled to the first and second switches;

a third switch selectively coupled to the first switch and the return channel gateway multiplexer that outputs data to a first gateway; and a fourth switch coupled to the third switch that outputs data to a second gateway.

7. The communication system as defined in claim 1 wherein each communication link implemented in the communication satellite comprises:

one or more first switches that communicate with corresponding gateways;

one or more gateway multiplexers coupled to the one or more first switches;

one or more second switches selectively coupled to the one or more gateway multiplexers and selectively coupled to the one or more first switches; and one or more regional multiplexers coupled to the one or more second switches that communicate with plurality of regions.

8. The communication system as recited in claim 7 wherein selected ones of the first and second switches comprise power dividing hybrids.

* * * * *